United States Patent Office 3,204,937
Patented Sept. 7, 1965

3,204,937
REFRACTORY LININGS FOR FURNACES
Giovanni Crespi, Omegna, Italy
No Drawing. Filed Sept. 10, 1962, Ser. No. 222,714
Claims priority, application Italy, Apr. 2, 1955,
29,676/55, Patent 531,089
9 Claims. (Cl. 263—46)

This application is a continuation-in-part of application Serial No. 572,213, filed March 18, 1956, now abandoned.

This invention relates to refractory linings for metallurgical furnaces. More particularly, it relates to basic linings of dolomite for large industrial furnaces. Heretofore the dolomite has been used in the form of a powder. The dolomite may be used as such or mixed with a binder such as tar or pitch. If desired, other materials which are commonly used to facilitate the transformation of the mixture into a more-or-less homogeneous refractory ceramic at high temperatures may also be incorporated in the lining.

These mixtures are more particularly used in electric arc furnaces, in Siemens-Martin furnaces, Thomas and oxygen converters and in mixers with satisfactory results. The utilization of dolomite in powder or in granules for such linings however is rather expensive and rather unhygienic for the workmen who must work in strongly dust-laden and caustic surroundings; in addition, the grinding of dolomite to powder or to small granules reduces its excellent refractory characteristics since in the smaller sizes there is a greater tendency to form the hydrate by reaction with moisture in the atmosphere.

I have found, however, that these disadvantages may be overcome if, contrary to the conventional and long-established practice, the lining is formed of massive or chunky dolomite in admixture with smaller sizes of dolomite. The latter may, if desired, be premixed with appropriate amounts of integrating and/or binding substances suitable for this mixture.

It is an object of the invention to provide an improved dolomitic lining for industrial furnaces.

It is another object of the invention to reduce the amount of labor required to install dolomitic linings in industrial furnaces.

Another object of the invention is to improve the health and safety conditions attendant the construction of dolomitic linings for industrial furnaces.

A further object of the invention is to provide a high density dolomitic lining having greater mechanical strength, serviceability and amount of refractory than heretofore possible.

These and other objects and many of the ensuing advantages of this invention will be readily appreciated from the following description.

In constructing the linings according to this invention use is made of a substantial proportion of massive or chunky dolomite in pieces within the approximate size range 40 to 120 mm. while the proportion of coarse dolomite may advantageously be between 30 and 70%, preferably 60–70% of the said mixture; under these circumstances the dolomite is far less sensitive to hydration and keeps intact its excellent refractory properties and mechanical resistance to high temperature.

The finer sized dolomite used for the filling may be mixed with any of the usual addition agents such as, for example, chromite, bauxite, ferric and ferrous oxides, cement, melted cement, talcum, clay, graphite, magnesite, silicates, and the like, for modifying the refractory and/or ceramic properties.

While ordinarily it is not necessary to add binding agents in the practice of the invention, nevertheless at times it may be advantageous to use tar, pitch, a mixture of tar and pitch, alkaline silicates, molasses, or other suitable organic or inorganic binding agents in liquid or pasty form.

Mixtures of the type described can advantageously be employed in basic refractory pisé work of walls and of hearth plates of furnaces, more particularly of electric arc furnaces of steel mills, open hearth furnaces, Thomas and oxygen converters, mixers, blast furnaces, cupola furnaces and rotary cement kilns, these linings being constructed on the job or, where convenient and appropriate, may be installed in the form of prefabricated elements.

The construction of the lining according to the present invention preferably will be in several layers following the usual practice. Since there are a substantial proportion of larger pieces of dolomite in the mixture, each layer will consequently be of a greater thickness than in the prior methods, for which reason it is preferable to use more powerful means of compacting the layers. With the present invention it is thus possible to substantially increase the density of the lining. Thus a hearth or bottom lining so constructed may have a specific gravity of 2.85–2.95, closely approximating that of natural dolomite 3.2, as compared with a specific gravity in the range 2.4–2.6 for linings constructed by the prior methods. It is understood that by natural dolomite is intended the dead-burned uncrushed dolomite, that is, as the dolomite exists immediately after it has been burned in preparation for its use in the making of furnace walls. If desired, strips of thin sheet metal or small round iron bars may be placed on the surface of each layer so as to obtain an even distribution of the stamping pressure and to serve as reinforcing for mechanically improving the cohesion of the entire mass.

In producing linings according to the methods heretofore in use, considerable difficulty is experienced in compacting the powdery dolomite since the amount of dust raised interferes with the operation of machinery and requires considerable hand work. Moreover, since the machinery tends to sink into the powdery mass, the weight of any machinery which may be employed is severely circumscribed. By contrast, however, in this invention, each layer is, for all practical purposes, composed of large chunks or pieces of dolomite of substantially its natural strength and other physical properties, with the finer ground material freely filling the spaces between the same substantially below the surface. Thus there is no necessity for workmen or machinery to move through any substantial amounts of the powdery material, thereby materially reducing the amount of dust raised. In addition, heavy equipment can be passed over this layer without sinking therein, thereby firmly and effectively packing the finer material into the interstices between the large pieces which form the major portion of the layer. Thus each layer is more compacted and of higher density than could heretofore be achieved with the finer sizes alone.

The invention will be more apparent from the following examples of its use in actual practice:

*Example I*

The bottom of a Siemens open hearth furnace, which had formerly been constructed wholly from powdered dolomite compacted on the furnace floor with or without the addition of tar, in the conventional manner, was built up by use of seventy-five parts massive dolomite in random sizes substantially as received from the quarry as the foundation or base course. The interstices of this base course were thereafter filled by the addition of some sixty-five parts of fine dolomite in the size range theretofore used, and the final layer compacted by stamping in the usual manner to form a mass of high specific gravity.

By this procedure, in preparing a lining approximately 500 millimeters (19 inches) thick, 65,000 kilograms of the fine sized dolomite and 75,000 kilograms of the larger sizes were used as compared with 120,000 kilograms of the powder alone in the prior methods. There was a further advantage in the reduction of direct and overhead labor costs. The job was finished in fourteen hours instead of the fifty-four usually required, and the number of workmen was simultaneously reduced from thirty-six to sixteen.

*Example II*

In this instance the invention was applied to Siemens-Martin furnaces having a steel production capacity of about 52,000 kilograms each. The bottom linings of these furnaces were replaced by linings constructed in accordance with the invention as described in Example I. The resulting lining was approximately 300 millimeters in thickness and was composed of about 14,000 kilograms of the chunky dolomite and about 12,000 kilograms of the finer sizes. In direct comparison, approximately 24,000 kilograms of dolomite powder alone were used to form the lining of the same area and thickness by the conventional technique.

The change in materials and construction procedure resulted in a substantial reduction in the labor and time, the job being finished in about ten hours, as compared with the thirty-nine or more previously required, with the labor crew reduced from twenty to twelve.

In addition to the savings in labor, there was a technical advantage in that the mass of the lining was increased by some 2,000 kilograms, or approximately 8% for the same area and thickness. This increase in materials used produces a denser, more compact lining with greater strength and wearing qualities.

*Example III*

Several electric arc furnaces of capacities ranging from about 18,000 kilograms to 35,000 kilograms each were provided with new bottom linings constructed in the same manner as described in Example I. There was a substantial lessening in the construction labor to about one-third of that previously required for construction of the conventional linings, and an increase of about 10% in the weight of the dolomitic material incorporated in the lining.

*Example IV*

The bottoms of two steel furnaces approximately 60,000 kilogram capacity each were relined with a layer of large coarse random-sized dolomite the interstices of which were filled with particles of dolomite of small or powdery size compacted to form a mass of high specific gravity substantially as described in Example I.

This permitted the formation of a lining 500 millimeters in thickness from 27,000 kilograms of the large-sized dolomite and 23,000 kilograms of the fine material. This compares to an average mass of 45,000 kilograms for a like lining constructed from the finer material by the conventional prior methods.

In addition to this material increase in weight and density of the new lining, there was a significant savings in labor. For either of the furnaces, the job was finished in twelve hours, instead of the thirty-eight or more ordinarily required, and with only ten workmen instead of the usual thirty.

*Example V*

The bottom of a Siemens-Martin steel furnace of approximately 100,000 kilograms capacity was rebuilt substantially as set forth in Example IV, to the usual thickness of 600 millimeters. In this work 55,000 kilograms of the chunky pieces were used together with 45,000 kilograms of dolomite powder, whereas in the prior construction with powdered dolomite alone, about 90,000 kilograms would ordinarily be used. This represents a most significant increase of 10,000 kilograms, or over 11%, in the weight of the refractory lining. Conversely, there was a very great reduction in the labor requirements, only fifteen hours and a crew of twelve as compared to the sixty-three hours and thirty workmen usually devoted to the job.

It will be understood, of course, that the foregoing examples are intended to be illustrative only and that the invention is not limited thereby. For example, while the invention increases the amount of refractory, and thus its density, for a given thickness of lining, this is for most purposes a substantial advantage. With a greater mass and density, the lining will be more refractory and able to carry greater loads without damage. The life of the lining is also increased, with resulting savings in labor and materials for repairs and upkeep. This increase in the life of the lining greatly reduces the number of shutdowns for repairs and replacements. However, if desired, the total quantity of refractory can be maintained at the lesser value while still securing much of the technical and economic advantages of the invention.

It should be understood, of course, that the foregoing disclosure relates only to preferred embodiments of the invention and that it is intended to cover all changes and modifications of the examples of the invention herein chosen for the purposes of the disclosure which do not constitute departures from the spirit and scope of the invention.

Having thus described the invention, what is claimed is:

1. Basic refractory pisé work for the bottom and walls of metallurgical furnaces and other industrial furnaces, formed by a refractory mixture consisting of coarse pieces of dolomite having a size between 40 and 120 mm. mixed with dolomite powder and granules of about 4–12 mm., said formed mixture having a specific gravity of 2.85 to 2.95.

2. Basic refractory pisé work for the bottom and walls of metallurgical furnaces and other industrial furnaces, formed by a refractory mixture consisting of 30 to 70% of coarse pieces of dolomite having a size of at least 40 mm. mixed with a balance of dolomite powder and granules of about 4–12 mm., said formed mixture having a specific gravity of 2.85 to 2.95.

3. Pisé work according to claim 1, characterized in that the dolomite mixture contains additions of powdery fusible cohesion-increasing substances which facilitate at high temperatures the formation of the dolomite into a kind of ceramic.

4. Pisé work according to claim 3, characterized in that the dolomite mixture contains between 5 and 25% of said powdery fusible cohesion-increasing substances.

5. Pisé work according to claim 1, characterized in that binding agents are provided which are in fluid form.

6. Pisé work according to claim 1 for the bottom of a furnace, consisting of a plurality of successive refractory layers of rammed material parallel to a bottom of a furnace, each layer being formed of said mixture.

7. Pisé work according to claim 6, characterized in that pieces of metal are mutually spacedly disposed over the surface of each layer, each piece of metal being completely surrounded by said refractory mixture.

8. Pisé work according to claim 7, characterized in that the pieces of metal are strips of thin sheet metal.

9. Pisé work according to claim 7, characterized in that said metal is iron.

References Cited by the Examiner

UNITED STATES PATENTS

| | | | |
|---|---|---|---|
| 1,569,197 | 1/26 | Maccallum | 263—46 |
| 1,707,055 | 3/29 | Driscoll | 94—9 |
| 1,729,884 | 10/29 | MacKenzie | 94—9 X |
| 2,201,534 | 5/40 | Hallenbeck | 94—44 |
| 2,206,277 | 7/40 | Crespi | 264—30 |
| 2,407,725 | 9/46 | Schoenlaub | 264—30 |

FOREIGN PATENTS 527,024   10/40   Great Britain.

CHARLES SUKALO, *Primary Examiner.*